(12) United States Patent
Pesek et al.

(10) Patent No.: US 12,031,020 B2
(45) Date of Patent: Jul. 9, 2024

(54) OLEFIN-BASED POLYMER COMPOSITIONS FOR FLOORING APPLICATIONS

(71) Applicant: Dow Global Technologies LLC, Midland, MI (US)

(72) Inventors: Stacy L. Pesek, Pearland, TX (US); Yushan Hu, Pearland, TX (US); Xiaosong Wu, Sugar Land, TX (US); Ronald J. Weeks, Lake Jackson, TX (US); Miguel Alberto De Jesus Prieto, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 7 days.

(21) Appl. No.: 17/257,581

(22) PCT Filed: Jul. 2, 2019

(86) PCT No.: PCT/US2019/040250
§ 371 (c)(1),
(2) Date: Jan. 3, 2021

(87) PCT Pub. No.: WO2020/010052
PCT Pub. Date: Jan. 9, 2020

(65) Prior Publication Data
US 2021/0277213 A1    Sep. 9, 2021

Related U.S. Application Data

(60) Provisional application No. 62/693,523, filed on Jul. 3, 2018.

(51) Int. Cl.
C08L 23/08    (2006.01)
C08K 3/26    (2006.01)
(Continued)

(52) U.S. Cl.
CPC ............ *C08L 23/0815* (2013.01); *C08K 3/26* (2013.01); *C08L 91/06* (2013.01); *D06N 7/0068* (2013.01);
(Continued)

(58) Field of Classification Search
CPC ........... C08L 23/0815; C08L 2205/025; C08L 91/06; C08L 23/08; C08K 2003/265
See application file for complete search history.

(56) References Cited

U.S. PATENT DOCUMENTS 4,335,034 A    6/1982 Zuckerman et al.
6,300,398 B1 *  10/2001 Jialanella ........... C09J 123/0815
                                                              524/277
(Continued)

FOREIGN PATENT DOCUMENTS

CN    1256705 A    6/2000
JP    2004189899 A    7/2004
(Continued)

OTHER PUBLICATIONS

PCT/US2019/040250, International Search Report and Written Opinion with a mailing date of Sep. 20, 2019.

*Primary Examiner* — Rip A Lee

(57) ABSTRACT

A composition comprising the following components: A) a first ethylene/alpha-olefin interpolymer with a melt index I2A; B) a second ethylene/alpha-olefin interpolymer with a melt index I2B; and wherein the difference in melt index (I2): (I2A−I2B)≥400, and wherein I2B≤100 g/10 min; C) a filler, and wherein the filler is present in an amount ≥50 wt %, based on the weight of the composition; D) a tackifier; and wherein the melt viscosity, at 165 C, of the composition, excluding the filler (component C), is ≤30,000 cP.

14 Claims, 1 Drawing Sheet

(51) Int. Cl.
  *C08L 23/06* (2006.01)
  *C08L 91/06* (2006.01)
  *D06N 7/00* (2006.01)

(52) U.S. Cl.
  CPC .. *C08K 2003/265* (2013.01); *C08L 2205/025* (2013.01); *C08L 2205/03* (2013.01); *D06N 2203/042* (2013.01)

(56) References Cited

U.S. PATENT DOCUMENTS

| | | | |
|---|---|---|---|
| 6,503,595 B1 * | 1/2003 | Kim | B32B 5/022 428/95 |
| 6,582,829 B1 * | 6/2003 | Quinn | C09J 123/0815 524/505 |
| 7,357,971 B2 | 4/2008 | Bieser et al. | |
| 7,989,543 B2 * | 8/2011 | Karjala | C08F 295/00 526/348 |
| 8,129,472 B2 * | 3/2012 | Turner | C08L 23/04 525/240 |
| 8,702,900 B2 * | 4/2014 | Hu | C09J 123/02 524/505 |
| 8,921,464 B2 * | 12/2014 | Liu | C08L 23/0853 524/394 |
| 9,051,683 B2 | 6/2015 | Brumbelow et al. | |
| 9,365,711 B2 | 6/2016 | Weeks | |
| 11,136,427 B2 | 10/2021 | Dhodapkar et al. | |
| 11,542,383 B2 * | 1/2023 | LiPiShan | C08K 3/00 |
| 2011/0256335 A1 | 10/2011 | Brumbelow et al. | |
| 2012/0178333 A1 | 7/2012 | Fowler et al. | |
| 2014/0037876 A1 | 2/2014 | Esangbedo et al. | |
| 2014/0171586 A1 | 6/2014 | Hu et al. | |
| 2015/0037579 A1 * | 2/2015 | Juers | C09J 123/0815 524/570 |
| 2018/0127564 A1 | 5/2018 | LiPiShan et al. | |

FOREIGN PATENT DOCUMENTS

| | | | |
|---|---|---|---|
| WO | 1994/010256 A1 | 5/1994 | |
| WO | 1998046694 A1 | 10/1998 | |
| WO | 2009/086091 A1 | 7/2009 | |
| WO | 2014105244 A1 | 7/2014 | |
| WO | 2016018670 A1 | 2/2016 | |
| WO | 2016209754 A1 | 12/2016 | |
| WO | WO 2016/209754 A1 * | 12/2016 | ............. C08L 23/26 |

* cited by examiner

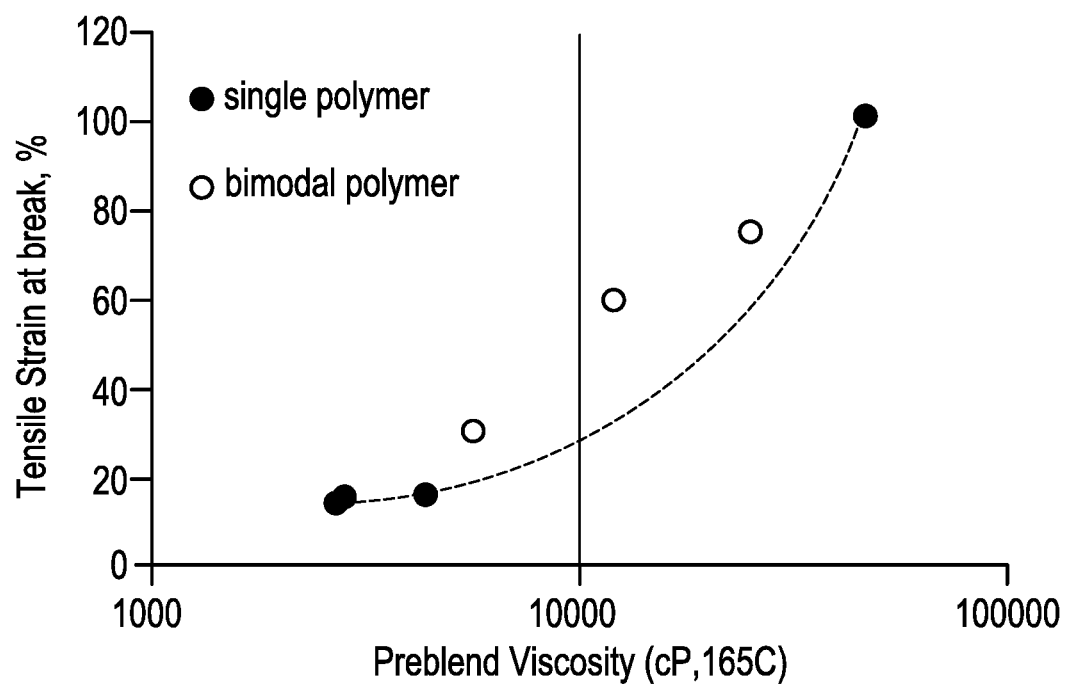

OLEFIN-BASED POLYMER COMPOSITIONS FOR FLOORING APPLICATIONS

CROSS-REFERENCE TO RELATED APPLICATIONS

This application claims the benefit of priority to U.S. patent application No. 62/693,523, filed on Jul. 3, 2018, which is incorporated herein by reference in its entirety.

BACKGROUND

There is a need for recyclable, low-viscosity filled polymer compositions, as alternatives to bitumen carpet backing, and which will meet the processing and performance requirements of the industry. For carpet backing application, the polymer compositions are often formulated with inorganic fillers to improve dimensional stability and reduce cost. As a result of increasing filler content, the mechanical properties of the formulation often deteriorates, particularly tensile "elongation at break," and the system viscosity increases significantly. Therefore, higher filler loading demands novel polymer design and proper formulations.

Polymer compositions and flooring applications are described in the following references: U.S. Pat. Nos. 9,365,711, 6,503,595 B1, WO 2016018670, U.S. Pat. Nos. 4,335,034, 9,051,683, US20110256335, U.S. Pat. No. 7,357,971, and WO2009086091. However, as discussed above, there remains a need for recyclable, low-viscosity filled polymer compositions with good processing and mechanical properties. These needs have been met by the following invention.

SUMMARY OF THE INVENTION

A composition comprising the following components:
A) a first ethylene/alpha-olefin interpolymer with a melt index I2A;
B) a second ethylene/alpha-olefin interpolymer with a melt index I2B; and
wherein the difference in melt index (I2): (I2A−I2B)≥400, and
wherein I2B≤100 g/10 min;
C) a filler, and wherein the filler is present in an amount ≥50 wt %, based on the weight of the composition;
D) a tackifier; and
wherein the melt viscosity, at 165° C., of the composition, excluding the filler (component C), is ≤30,000 cP.

BRIEF DESCRIPTIONS OF THE DRAWINGS

FIG. 1 is a plot of preblend viscosity versus "tensile elongation at break" for both inventive compositions (Inv. Exs. 1-3) and comparative compositions (Comp. Exs. A-D)).

DETAILED DESCRIPTION

Ethylene-octene random copolymers and block copolymers with low melt flow (e.g., MI (or I2) around 30 g/10 min, 2.16 kg @ 190° C.) are used in hot melt adhesives in carpet backing products. However, the "30 MI" polymer component of the formulation contributes to a high viscosity backing. Compositions, comprising a low MI and a high MI ethylene/alpha-olefin interpolymers, have been discovered, which provide a better balance of tensile elongation and composition viscosity, at a given filler loading. Such compositions maintain tensile elongation (>20%) at high filler uptake (>70 wt %), have reduced overall viscosity of the filled composition (preblend viscosity ≤30,000 cP at 165° C.), and are well suited for carpet backing applications. These compositions are recyclable, have good mechanical properties, and good processing, due to, for example, low viscosities that can be pumped using conventional equipment.

As discussed above, a composition is provided, which comprises the following components:
A) a first ethylene/alpha-olefin interpolymer with a melt index I2A;
B) a second ethylene/alpha-olefin interpolymer with a melt index I2B; and
wherein the difference in melt index (I2): (I2A−I2B)≥400, or ≥450, or ≥500, and
wherein I2B≤100 g/10 min;
C) a filler, and wherein the filler is present in an amount ≥50 wt %, based on the weight of the composition;
D) a tackifier; and
wherein the melt viscosity, at 165° C., of the composition, excluding the filler (component C), is ≤30,000 cP.

The above composition may comprise a combination of two or more embodiments described herein.

In one embodiment, or a combination of embodiments described herein, the second interpolymer has an I2B≤90, or ≤80, or ≤70, or ≤60, or ≤50, or ≤40, or ≤35, or ≤30, or ≤25, or ≤20, or ≤15, or ≤10, or ≤5.0 g/10 min.

In one embodiment, or a combination of embodiments described herein, the filler is present in an amount ≥55 wt %, or ≥60 wt %, or ≥65 wt %, or ≥70 wt %, based on the weight of the composition. In one embodiment, or a combination of embodiments described herein, the filler is present in an amount <100 wt %, or ≤98 wt %, or ≤96 wt %, or ≤94 wt %, based on the weight of the composition.

In one embodiment, or a combination of embodiments described herein, the composition has a melt viscosity, at 165° C., of the composition, excluding the filler (component C), ≤28,000 cP, or ≤29,000 cP, or ≤28,000 cP, or ≤26,000 cP.

In one embodiment, or a combination of embodiments described herein, the composition has a melt viscosity, at 165° C., of the composition, excluding the filler (component C), ≤2,000 cP, or ≤3,000 cP, or ≤4,000 cP, or ≤5,000 cP.

In one embodiment, or a combination of embodiments described herein, the melt viscosity, at 165° C., of the composition, excluding the filler (component C), is from 5,000 cP to 30,000 cP, or from 5,000 cP to 29,000 cP, or from 5,000 cP to 28,000 cP.

In one embodiment, or a combination of embodiments described herein, the melt viscosity, at 120° C., of the composition, excluding the filler (component C), is from 10,000 cP to 120,000 cP, or from 12,000 cP to 100,000 cP or from 15,000 cP to 90,000 cP.

In one embodiment, or a combination of embodiments described herein, the composition has a tensile elongation at break of greater than or equal to 15%, or greater than or equal to 20%, or greater than or equal to 25%, or greater than or equal to 30%, or greater than or equal to 40%, or greater than or equal to 50%, or greater than or equal to 60%, or greater than or equal to 75%. In one embodiment, or a combination of embodiments described herein, the composition has a tensile elongation at break from 15% to 75%.

In one embodiment, or a combination of embodiments described herein, the composition has a tensile modulus of less than 400 MPa, or from greater than 100 MPa to less than 400 MPa, or from greater than 150 MPa to less than 400 MPa, or from greater than 170 MPa to less than 400 MPa, or from greater than 170 MPa to less than or equal to 350 MPa.

In one embodiment, or a combination of embodiments described herein, the composition has a tensile strength from greater than or equal to 2 MPa to 5 MPa, or from greater than or equal to 2 MPa to 4.5 MPa, or from greater than or equal to 2 MPa to 4.0 MPa, or from greater than or equal to 2 MPa to 3.6 MPa.

In one embodiment, or a combination of embodiments described herein, component C (filler) is selected from talc, carbon black, or calcium carbonate, further carbon black, or calcium carbonate, further calcium carbonate ($CaCO_3$).

In one embodiment, or a combination of embodiments described herein, the component further comprises, as component E, a wax. Examples of suitable waxes include FischerTropsch waxes, hydrocarbon waxes, PE waxes, and PP waxes.

In one embodiment, or a combination of embodiments described herein, the amount of component E is from 1.0 to 5.0 wt %, or from 1.0 to 4.0 wt %, or from 1.0 to 3.0 wt %, or from 1.0 to 2.0 wt % based on weight of the composition.

In one embodiment, or a combination of embodiments described herein, the composition further comprising an oil. In a further embodiment, the weight ratio of the oil to component E is from 0.5 to 1.5.

In one embodiment, or a combination of embodiments described herein, the first ethylene/alpha-olefin interpolymer has a density ≤0.895 g/cc, or ≤0.890 g/cc, or ≤0.885 g/cc, or ≤0.880 g/cc, or ≤0.875 g/cc, or ≤0.870 g/cc (1 cc=1 $cm^3$). In one embodiment, or a combination of embodiments described herein, the first ethylene/alpha-olefin interpolymer has a density ≥0.855 g/cc, or ≥0.860 g/cc, or ≥0.865 g/cc.

In one embodiment, or a combination of embodiments described herein, the second ethylene/alpha-olefin interpolymer has a density ≤0.895 g/cc, or ≤0.890 g/cc, or ≤0.885 g/cc, or ≤0.880 g/cc, or ≤0.875 g/cc, or ≤0.870 g/cc. In one embodiment, or a combination of embodiments described herein, the second ethylene/alpha-olefin interpolymer has a density ≥0.855 g/cc, or ≥0.860 g/cc, or ≥0.865 g/cc.

In one embodiment, or a combination of embodiments described herein, the first ethylene/alpha-olefin interpolymer has a melt index I2A≥400, or ≥500, or ≥600, or ≥700, or ≥800, or ≥900, or ≥1000, or ≥1100 or ≥1200 g/10 min. In one embodiment, or a combination of embodiments described herein, the first ethylene/alpha-olefin interpolymer has a melt index I2A≤5000, or ≤4000, or ≤3000.

In one embodiment, or a combination of embodiments described herein, the first ethylene/alpha-olefin interpolymer has a melt index I2A≥400 g/10 min, or ≥500 g/10 min, and a density ≤0.895 g/cc, or ≤0.890 g/cc, or ≤0.885 g/cc, or ≤0.880 g/cc, or ≤0.875 g/cc, or ≤0.870 g/cc, or from 0.855 to 0.895 g/cc.

In one embodiment, or a combination of embodiments described herein, the density ratio of component A to component B is from 0.80 to 1.20, or from 0.85 to 1.15, or from 0.90 to 1.10, or from 0.95 to 1.05.

In one embodiment, or a combination of embodiments described herein, the difference in melt index (I2): (I2A−I2B)≥600, or ≥700, or ≥800, or ≥900, or ≥1000, or ≥1100, or ≥1200 g/10 min.

In one embodiment, or a combination of embodiments described herein, the ratio of the melt index (I2) component A to melt index (I2) of component B is from 2.0 to 50, or from 5.0 to 50, or from 10 to 50, or from 15 to 45.

In one embodiment, or a combination of embodiments described herein, the ratio of the melt index (I2) component A to melt index (I2) of component B is from 5.0 to 250, or from 5.0 to 200, or from 5.0 to 150, or from 5.0 to 100, or from 5.0 to 50.

In one embodiment, or a combination of embodiments described herein, the absolute value of the density differential between component A and component B is ≤0.300, or ≤0.250, or ≤0.200, or ≤0.150, or ≤0.100, or ≤0.050. In one embodiment, or a combination of embodiments described herein, the absolute value of the density differential between component A and component B is ≥0, or ≥0.002, or ≥0.004.

In one embodiment, or a combination of embodiments described herein, the first ethylene/alpha-olefin interpolymer has a molecular weight distribution (MWD)≥1.8, or ≥2.0, or ≥2.2. In one embodiment, or a combination of embodiments described herein, the first ethylene/alpha-olefin interpolymer has a molecular weight distribution (MWD)≤3.2, or ≤3.0, or ≤2.8, or ≤2.6.

In one embodiment, or a combination of embodiments described herein, the second ethylene/alpha-olefin interpolymer has a molecular weight distribution (MWD)≥1.5, or ≥1.6, or ≥1.7, or ≥1.8. In one embodiment, or a combination of embodiments described herein, the second ethylene/alpha-olefin interpolymer has a molecular weight distribution (MWD)≤2.5, or ≤2.4, or ≤2.3, or ≤2.2.

In one embodiment, or a combination of embodiments described herein, the first ethylene/alpha-olefin interpolymer has a weight average molecular weight (Mw)≥10,000, or ≥12,000, or ≥14,000, or ≥16,000, or ≥18,000 g/mole. In one embodiment, or a combination of embodiments described herein, the first ethylene/alpha-olefin interpolymer has a weight average molecular weight (Mw)≤34,000, or ≤32,000, or ≤30,000, or ≤28,000, or ≤26,000, or ≤24,000 g/mole.

In one embodiment, or a combination of embodiments described herein, the weight ratio of "sum of components A and B" to "component D" is from 1.0 to 2.0, or from 1.2 to 1.8.

In one embodiment, or a combination of embodiments described herein, the tackifier (component D) is present in an amount ≤50 wt %, or ≤45 wt %, or ≤40 wt %, or ≤35 wt %, or ≤30 wt %, based on the weight of the composition without filler. In one embodiment, or a combination of embodiments described herein, the tackifier (component D) is present in an amount ≥5.0 wt %, or ≥7.0 wt %, or ≥10 wt %, based on the weight of the composition without filler.

In one embodiment, or a combination of embodiments described herein, the tackifier (component D) is present in an amount ≤20 wt %, or ≤15 wt %, or ≤10 wt %, or ≤5 wt %, based on the weight of the composition. In one embodiment, or a combination of embodiments described herein, the tackifier (component D) is present in an amount ≥0.5 wt %, or ≥1.0 wt %, or ≥2.0 wt %, based on the weight of the composition without filler. In one embodiment, or a combination of embodiments described herein, the weight ratio of "sum of components A and B" to "component C" is from 0.10 to 0.50, or from 0.20 to 0.40.

In one embodiment, or a combination of embodiments described herein, weight ratio of "sum of components A and B" to "component E" is from 3.0 to 5.5, or from 3.2 to 5.3.

In one embodiment, or a combination of embodiments described herein, the amount of the "sum of components A and B" from 1.0 to 20 wt %, or from 2.0 to 15 wt %, or from 5.0 to 10 wt %, based on the weight of the composition.

In one embodiment, or a combination of embodiments described herein, the weight ratio of "component A" to "component B" is from 0.20 to 4.00, or from 0.25 to 3.50, or from 0.30 to 3.00.

In one embodiment, or a combination of embodiments described herein, the first ethylene/alpha-olefin interpolymer is a random ethylene/alpha-olefin interpolymer. In a further embodiment, the alpha-olefin is a C4-C10 alpha-olefin, further a C6-C8 alpha-olefin, further 1-hexene or 1-octene, further 1-octene.

In one embodiment, or a combination of embodiments described herein, the first ethylene/alpha-olefin interpolymer is a random ethylene/alpha-olefin copolymer. In a further embodiment, the alpha-olefin is a C4-C10 alpha-olefin, further a C6-C8 alpha-olefin, further 1-hexene or 1-octene, further 1-octene.

In one embodiment, or a combination of embodiments described herein, the second ethylene/alpha-olefin interpolymer is a random ethylene/alpha-olefin interpolymer. In a further embodiment, the alpha-olefin is a C4-C10 alpha-olefin, further a C6-C8 alpha-olefin, further 1-hexene or 1-octene, further 1-octene.

In one embodiment, or a combination of embodiments described herein, the second ethylene/alpha-olefin interpolymer is a random ethylene/alpha-olefin copolymer. In a further embodiment, the alpha-olefin is a C4-C10 alpha-olefin, further a C6-C8 alpha-olefin, further 1-hexene or 1-octene, further 1-octene.

In one embodiment, or a combination of embodiments described herein, the first ethylene/alpha-olefin interpolymer is an ethylene/alpha-olefin copolymer. In a further embodiment, the alpha-olefin is a C4-C10 alpha-olefin, further a C6-C8 alpha-olefin, further 1-hexene or 1-octene, further 1-octene.

In one embodiment, or a combination of embodiments described herein, the second ethylene/alpha-olefin interpolymer is an ethylene/alpha-olefin copolymer. In a further embodiment, the alpha-olefin is a C4-C10 alpha-olefin, further a C6-C8 alpha-olefin, further 1-hexene or 1-octene, further 1-octene.

In one embodiment, or a combination of embodiments described herein, the first ethylene/alpha-olefin interpolymer is a random ethylene/alpha-olefin copolymer, and the second ethylene/alpha-olefin interpolymer is a random ethylene/alpha-olefin copolymer. In a further embodiment, the alpha-olefin is a C4-C10 alpha-olefin, further a C6-C8 alpha-olefin, further 1-hexene or 1-octene, further 1-octene.

In one embodiment, or a combination of embodiments described herein, the alpha-olefin of the first ethylene/alpha-olefin interpolymer is a C4-C10 alpha-olefin, further a C6-C8 alpha-olefin, further 1-hexene or 1-octene, further 1-octene.

In one embodiment, or a combination of embodiments described herein, the alpha-olefin of the second ethylene/alpha-olefin interpolymer is a C4-C10 alpha-olefin, further a C6-C8 alpha-olefin, further 1-hexene or 1-octene, further 1-octene.

Each ethylene/alpha-olefin interpolymer may comprise a combination of two or more embodiments as described herein.

In one embodiment, or a combination of embodiments described herein, the composition comprises ≤5.0 wt %, or ≤4.0 wt %, or ≤3.0 wt %, or ≤2.0 wt % of an anhydride grafted and/or carboxylic acid grafted polymer (for example, a grafted ethylene-based polymer or a grafted propylene-based polymer), based on the weight of the composition. In a further embodiment, the anhydride grafted and/or carboxylic acid grafted polymer is an anhydride grafted and/or carboxylic acid grafted olefin-based polymer (for example, a grafted ethylene-based polymer or a grafted propylene-based polymer). In one embodiment, the composition comprises ≥0.1 wt %, or ≥0.2 wt %, or ≥0.5 wt %, or ≥1 wt % of an anhydride grafted and/or carboxylic acid grafted polymer (for example, a grafted ethylene-based polymer or a grafted propylene-based polymer), based on the weight of the composition. In a further embodiment, the anhydride grafted and/or carboxylic acid grafted polymer is an anhydride grafted and/or carboxylic acid grafted olefin-based polymer (for example, a grafted ethylene-based polymer or a grafted propylene-based polymer).

In one embodiment, or a combination of embodiments described herein, the composition comprises ≤1.0 wt %, or ≤0.5 wt %, or ≤0.1 wt % of a polar polymer, based on the weight of the composition. In a further embodiment, the composition does not comprises a polar polymer.

In one embodiment, or a combination of embodiments described herein, the composition comprises ≤1.0 wt %, or ≤0.5 wt %, or ≤0.1 wt % of an ethylene vinyl acetate copolymer, based on the weight of the composition. In a further embodiment, the composition does not comprises an ethylene vinyl acetate copolymer.

In one embodiment, or a combination of embodiments described herein, or a the composition comprises ≤1.0 wt %, or ≤0.5 wt %, or ≤0.1 wt % of a styrene-containing polymer, based on the weight of the composition. In a further embodiment, the composition does not comprises a styrene-containing polymer (polymer comprises polymerized styrene).

In one embodiment, or a combination of embodiments described herein, the composition comprises ≤1.0 wt %, or ≤0.5 wt %, or ≤0.1 wt % of a propylene-based polymer, based on the weight of the composition. In a further embodiment, the composition does not comprises a propylene-based polymer.

In one embodiment, or a combination of embodiments described herein, the composition comprises ≤1.0 wt %, or ≤0.5 wt %, or ≤0.1 wt % of a polyvinyl chloride, based on the weight of the composition. In a further embodiment, the composition does not comprises a polyvinyl chloride.

In one embodiment, or a combination of embodiments described herein, the composition comprises ≤1.0 wt %, or ≤0.5 wt %, or ≤0.1 wt % of a polyurethane, based on the weight of the composition. In a further embodiment, the composition does not comprises a polyurethane.

In one embodiment, or a combination of embodiments described herein, the composition comprises ≤1.0 wt %, or ≤0.5 wt %, or ≤0.1 wt % of a fluorinated olefin-based polymer (for example, tetrafluoropropylene homopolymer, tetrafluoroethylene homopolymer, or a copolymer of a tetrafluoropropylene and tetrafluoroethylene), based on the weight of the composition. In a further embodiment, the composition does not comprises a fluotinated olefin-based polymer.

In one embodiment, or a combination of embodiments described herein, the composition comprises ≤1.0 wt %, or ≤0.5 wt %, or ≤0.1 wt %, based on the weight of the composition, of one or more of the following polymers: ethylene vinyl acetate copolymer, polyvinyl chloride, polyvinyl dichloride, polystyrene, a polyamide, a polycarbonate, ethylene acrylic acid copolymer, a polymer comprising polymerized styrene.

In one embodiment, the composition comprises ≤1.0 wt %, or ≤0.5 wt %, or ≤0.1 wt % of a slip agent (for example, oleamide and erucamide), based on the weight of the composition. In a further embodiment, the composition does not comprises a slip agent. In one embodiment, or a combination of embodiments described herein, the composition comprises ≤1.0 wt %, or ≤0.5 wt %, or ≤0.1 wt % of an anti-blocking agent (for example, silicon dioxide), based on the weight of the composition. In a further embodiment, the composition does not comprises an anti-blocking agent.

Also provided is an article comprising at least one component formed from the composition of one or more embodiments herein. In one embodiment, or a combination of embodiments described herein, the article is a tile.

In one embodiment, or a combination of embodiments described herein, the tile has a total thickness ≥2.0 mm, or ≥2.5 mm, or ≥3.0 mm, or ≥3.5 mm. In one embodiment, the tile has a total thickness ≤8.0 mm, or ≤7.0 mm, or ≤6.0 mm, or ≤5.0 mm. In one embodiment, or a combination of embodiments described herein, the tile has a thickness from 2.0 mm to 5.0 mm. Note, 1 mm=39.4 mils; and 1 mm=1000 microns.

In one embodiment, or a combination of embodiments described herein, the tile has a total thickness from 80 to 150 mils, or from 80 to 120 mils, or from 80 to 100 mils.

Also provided is a carpet comprising at least one component formed from the composition of one or more embodiments herein.

An article may comprise a combination of two or more embodiments as described herein.

Compositions and Articles

In one embodiment, or a combination of embodiments described herein, the polymer composition comprises one or more additives. Additives include, but are not limited to, antioxidants, ultraviolet absorbers, antistatic agents, colorants (e.g., titanium dioxide, carbon black and pigments), viscosity modifiers, flame retardants, odor modifiers/absorbents, and any combination thereof.

In one embodiment, or a combination of embodiments described herein, the composition further comprises a thermoplastic polymer, different in one or more properties from the first ethylene/alpha-olefin interpolymer and the second ethylene/alpha-olefin interpolymer. Illustrative polymers, include, but not limited to, propylene-based polymers, ethylene-based polymers, and olefin multi-block interpolymers. Suitable ethylene-base polymers include, but are not limited to, high density polyethylene (HDPE), linear low density polyethylene (LLDPE), very low density polyethylene (VLDPE), ultra-low density polyethylene (ULDPE), homogeneously branched linear ethylene polymers, and homogeneously branched substantially linear ethylene polymers (that is homogeneously branched long chain branched ethylene polymers).

The compositions of the present invention may be used to prepare a variety of articles, or their component parts or portions. The inventive compositions may be converted into a finished article of manufacture by any one of a number of conventional processes and apparatus. Illustrative processes include, but are not limited to, adhesives, injection molding, extrusion, calendaring, compression molding, and other typical thermoset material forming processes. Articles include, but are not limited to, sheets, foams, molded goods, and extruded parts. Additional articles include flooring materials (for example, tiles and carpets), roofing materials, automotive parts, weather strips, belts, hoses, building profiles, wire and cable jacketing, gaskets, tires and tire components, computer parts, building materials, awnings, banners, signs, tents, tarpaulins, and liners (for example for pools, ponds or landfills), book bindings, and carriers (for example, sporting bags and backpacks) and footwear components.

DEFINITIONS

Unless stated to the contrary, all test methods are current as of the filing date of this disclosure.

The term "composition," as used herein, includes a material or mixture of materials which comprise the composition, as well as reaction products and decomposition products formed from the materials of the composition. Typically, any reaction products and/or decomposition products are present in trace amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "olefin-based polymer," as used herein, refers to a polymer that comprises, in polymerized form, 50 wt % or a majority amount of an olefin monomer, for example, ethylene or propylene, based on the weight of the polymer, and optionally may comprise one or more comonomers.

The term "propylene-based polymer," as used herein, refers to a polymer that comprises, in polymerized form, a majority amount of propylene monomer (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene-based interpolymer," as used herein, refers to an interpolymer that comprises, in polymerized form, 50 wt % or a majority amount of ethylene monomer (based on the weight of the interpolymer), and at least one comonomer.

The term, "ethylene-based copolymer," as used herein, refers to a copolymer that comprises, in polymerized form, 50 wt % or a majority amount of ethylene monomer (based on the weight of the copolymer), and a comonomer, as the only two monomer types.

The term, "ethylene/α-olefin interpolymer," as used herein, refers to an interpolymer that comprises, in polymerized form, 50 wt % or a majority amount of ethylene monomer (based on the weight of the interpolymer), and at least one α-olefin.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Specific embodiments of the present disclosure include but are not limited to the following:
1. A composition comprising the following components:
   A) a first ethylene/alpha-olefin interpolymer with a melt index I2A;
   B) a second ethylene/alpha-olefin interpolymer with a melt index I2B; and
   wherein the difference in melt index (I2): (I2A−I2B) ≥400, and
   wherein I2B≤100 g/10 min;
   C) a filler, and wherein the filler is present in an amount ≥50 wt %, based on the weight of the composition;
   D) a tackifier; and
   wherein the melt viscosity, at 165° C., of the composition, excluding the filler (component C), is ≤30,000 cP.
2. The composition of embodiment 1, further comprising, as component E, a wax.
3. The composition of embodiment 1 or embodiment 2, further comprising an oil.
4. The composition of embodiment 3, wherein the composition comprises component E, and the weight ratio of the oil to component E is from 0.5 to 1.5.
5. The composition of any one of the previous embodiments, wherein the first ethylene/alpha-olefin interpolymer has a melt index I2A≥400, and a density ≤0.895 g/cc.
6. The composition of any one of the previous embodiments, wherein the density ratio of component A to component B is from 0.80 to 1.20.
7. The composition of any one of the previous embodiments, wherein the ratio of the melt index (I2) component A to melt index (I2) of component B is from 10 to 50.
8. The composition of any one of the previous embodiments, wherein the melt viscosity, at 165° C., of the composition, excluding the filler (component C), is from 5,000 cP to 30,000 cP.
9. The composition of any one of the previous embodiments, wherein weight ratio of "sum of components A and B" to "component D" is from 1.0 to 2.0.
10. The composition of any one of the previous embodiments, wherein weight ratio of "sum of components A and B" to "component C" is from 0.10 to 0.50.
11. The composition of any one of the previous embodiments, wherein the composition comprises component E, and the weight ratio of "sum of components A and B" to "component E" is from 3.0 to 5.5.
12. The composition of any one of the previous embodiments, wherein amount of the "sum of components A and B" is from 5.0 to 10 wt %, based on the weight of the composition.
13. The composition of any one of the previous embodiments, wherein the composition comprises component E, and the amount of component E is from 1.0 to 5.0 wt %, based on weight of the composition.
14. The composition of any one of the previous embodiments, wherein the first ethylene/alpha-olefin interpolymer is an ethylene/alpha-olefin copolymer, and the second ethylene/alpha-olefin interpolymer is an ethylene/alpha-olefin copolymer.
15. The composition of any one of the previous embodiments, wherein the alpha-olefin of the first ethylene/alpha-olefin interpolymer is a C4-C10 alpha-olefin, and further a C6-C8 alpha-olefin.
16. The composition of any one of the previous embodiments, wherein the alpha-olefin of the second ethylene/alpha-olefin interpolymer is a C4-C10 alpha-olefin, and further a C6-C8 alpha-olefin.
17. The composition of any one of the previous embodiments, wherein the composition comprises ≤1.0 wt % of a polar polymer, based on the weight of the composition.
18. The composition of any one of the previous embodiments, wherein the composition comprises ≤1.0 wt % of an ethylene vinyl acetate, based on the weight of the composition.
19. The composition of any one of the previous embodiments, wherein the composition comprises ≤1.0 wt % of a styrene-containing polymer, based on the weight of the composition.
20. The composition of any one of the previous embodiments, wherein the composition comprises ≤1.0 wt % of a propylene-based polymer, based on the weight of the composition.
21. The composition of any one of the previous embodiments, wherein the absolute value of the density differential between component A and component B is ≤0.300.
22. The composition of any one of the previous embodiments, wherein the composition has a tensile elongation at break of greater than or equal to 15%, or greater than or equal to 20%, or greater than or equal to 25%, or greater than or equal to 30%, or greater than or equal to 40%, or greater than or equal to 50%, or greater than or equal to 60%, or greater than or equal to 75%.
23. The composition of any one of the previous embodiments, wherein the composition has a tensile elongation at break from greater than 15% to 75%.
24. The composition of any one of the previous embodiments, wherein the composition has a tensile modulus of less than 400 MPa, or from greater than 100 MPa to less than 400 MPa, or from greater than 150 MPa to less than 400 MPa, or from greater than 170 MPa to less than 400 MPa, or from greater than 170 MPa to less than or equal to 350 MPa.
25. The composition of any one of the previous embodiments, wherein the composition has a tensile strength from greater than or equal to 2 MPa to 5 MPa, or from greater than or equal to 2 MPa to 4.5 MPa, or from greater than or equal to 2 MPa to 4.0 MPa, or from greater than or equal to 2 MPa to 3.6 MPa.
26. An article comprising at least one component formed from the composition of any one of the previous embodiments.
27. The article of embodiment 26, wherein the article is a tile.
28. A building structure comprising the tile of embodiment 27.
29. A flooring structure comprising the tile of embodiment 27.
30. A carpet comprising at least one component formed from the composition of any one of embodiments 1-25.

Test Methods

Density

Density was measured in accordance with ASTM D-792.

Melt Index ($I_2$) and Melt Flow Rate (MFR)

Melt index (2.16 kg, 190° C.) for an ethylene-based polymer was measured in accordance with ASTM D-1238.

MFR (2.16 kg, 230° ° C.) for a propylene-based polymer was measured in accordance with ASTM D-1238.

GPC Molecular Weight and Molecular Weight Distribution

Molecular weight is determined using gel permeation chromatography (GPC), on a Waters 150° ° C. high temperature chromatographic unit, equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 ml/min and the injection size is 100 microliters.

The molecular weight determination is deduced by using narrow molecular weight distribution, polystyrene standards (from Polymer Laboratories), in conjunction with their elution volumes. The equivalent polyethylene molecular weights are determined by using appropriate Mark-Houwink coefficients for polyethylene and polystyrene (as described by T. Williams & I. M. Ward, The Construction of a Polyethylene Calibration Curve for Gel Permeation Chromatography Using Polystyrene Fractions, 6 J. Polymer Sci. Pt. B: Polymer Letter 621, 621-624 (1968)) to derive the following equation:

$M_{polyethylene} = a \times (M_{polystyrene})^b$. In this equation, $a = 0.4316$ and $b = 1.0$.

Number average molecular weight, $M_n$, of a polymer is expressed as the first moment of a plot of the number of molecules in each molecular weight range, against the molecular weight. In effect, this is the total molecular weight of all molecules, divided by the number of molecules, and is calculated in the usual matter, according to the following formula:

$$M_n = \sum n_i \times M_i / \sum n_i = \sum w_i / \sum (w_i / M_i), \text{ where}$$

$n_i$ = number of molecules with molecular weight $M_i$.
$w_i$ = weight fraction of material having molecular weight $M_i$,
and $\Sigma\, n_i$ = total number of molecules.

Weight average molecular weight, $M_w$, is calculated, in the usual manner, according to the following formula: $M_w = \Sigma w_i \times M_i$, where $w_i$ and $M_i$ are the weight fraction and molecular weight, respectively, of the $i^{th}$ fraction eluting from the GPC column. The ratio of these two averages, the molecular weight distribution (MWD or $M_w/M_n$), defines the breadth of the molecular weight distribution.

Differential Scanning Calorimetry (DSC) (Component a and Component B)

Differential Scanning calorimetry (DSC) is used to measure melting and crystallization behavior of polymers (e.g., ethylene-based (PE) polymers, and propylene-based (PP) polymers). The sample is first melt pressed (25000 lbs for about 10 sec) into a thin film, at about 175° C., and then cooled to room temperature. About "5 mg to 8 mg" of polymer film sample is cut with a die punch, and is weighed and placed into a DSC pan. The lid is crimped on the pan to ensure a closed atmosphere. The sample pan is placed into a calibrated DSC cell purged with nitrogen gas, and then heated at a rate of approximately 10° C./min, to a temperature of 180° C. for PE (230° ° C. for PP). The sample is kept at this temperature for three minutes. Then the sample is cooled, at a rate of 10° C./min, to −40° C., to record the crystallization trace, and kept isothermally at that temperature for three minutes. The sample is next reheated at a rate of 10° C./min, until complete melting. Unless otherwise stated, peak melting point (Tm) is determined from the second heating curve, and corresponds to the temperature of the highest peak (intensity) in the endotherm. The crystallization temperature (Tc) is determined from the cooling curve (peak Tc). The Tg is measured from the second heating curve, and determined at the midpoint of the inflection transition.

EXPERIMENTAL

Materials

Materials used in this section are shown in Table 1 below. Polymer properties are shown in Table 2.

TABLE 1

Materials

| Material | Description | Supplier |
|---|---|---|
| AFFINITY GA 1875 | E/O random copolymer with density 0.870 g/cc, molecular weight Mw 18600 g/mol. | Dow Chemical Company |
| AFFINITY GA 1900 | E/O random copolymer with density 0.870 g/cc, molecular weight, Mw 19500 g/mol. | Dow Chemical Company |
| AFFINITY GA 1950 | E/O random copolymer with density 0.874 g/cc, viscosity 17,000 cP, molecular weight, Mw 22500 g/mol. | Dow Chemical Company |
| ENGAGE 8400 | E/O random copolymer with density 0.870 g/cc, 30 MI | Dow Chemical Company |
| ENGAGE 8401 | E/O random copolymer with density 0.885 g/cc, 30 MI, | Dow Chemical Company |
| AMPLIFY GR216 | MAH grafted E/O random copolymer, density 0.870, 1.25 MI, Graft density 0.9 wt % | Dow Chemical Company |
| Tackifier | REGALITE R1090, C9-aromatic, fully hydrogenated tackifier with Tg 43° C. | Eastman Chemical Company |
| Wax | SASOL H1 wax, FischerTropsch wax | Sasol Performance Chemicals |
| Oil | SUNPAR 120, solvent dewaxed heavy parrafinic oil | R. E. Carrol, Inc. |
| CARBOCIA 310 | Calcium carbonate filler, 310 um average particle size | |
| IRGANOX 1010 | Antioxidant | BASF Chemical Company |

TABLE 2

Summary of Polymer Characteristics

| Product | MI | Viscosity at 177° C. | Mw (g/mol) | PDI |
|---|---|---|---|---|
| AFFINITY GA 1875 | 1250 | | 18617 | 2.59 |
| AFFINITY GA 1900 | 1000 | | 19500 | 2.16 |
| AFFINITY GA 1950 | 500 | 17,000 cP | 22500 | 2.26 |
| ENGAGE 8400 | 30 | | 48000 | 2.13 |
| ENGAGE 8401 | 30 | | 68200 | 1.88 |

Compounding

Compounding (with Filler):

The compounding of all sample formulations (compositions) with filler was performed on a rotating Haake Rheomix 3000, at 180° ° C. The raw materials, excluding filler, were added sequentially, and mixed at 180° ° C., at 20 rpm, until uniformly mixed (about five minutes). Then the filler was added over a five minute period. The material was mixed for 35 minutes, at 35 rpm, after the final addition of filler.

Compounding (without Filler):

The compounding of all HMA sample formulations (compositions) was performed in a Haake Rheomix 600 reactor assembly, maintained at a "180° C." cavity temperature. The raw materials, except for the antioxidant and oil, were initially dry mixed, and then added to the Rheomix 600 cavity, at 30 rpm mixing speed. The antioxidant was added, at the same mixing speed, to the cavity, after the dry mix components had melted, and this addition was followed the addition of the oil. The ram was secured down, after completion of the raw materials addition, then the mixing speed was increased to 50 rpm, and the mixing continued for a total compounding time of 36 minutes, from the time of initial dry mix addition to the Rheomix compounding cavity.

Compression Molding:

The blended composition was taken out of the mixer, and compression molded into plaques for physical testing. The plaque dimensions were 6" by 2.5" by 0.08" thick. The blended composition was pre-melted at 190° ° C., for one minute, at 5,000 lb, and then pressed for five minutes, at 30,000 lb, and then cooled between cold plates at 17° ° C. for one minute.

Test Methods

Brookfield Viscosity

A Brookfield Digital Viscometer Model LVDV-1 Prime, with a thermosel, was used, in accordance with ASTM D1986 Standard Test for Apparent Viscosity of Hot Melt Adhesives and Coating Materials. Compositions containing filler were measured with spindle SC4-27. Compositions without filler were measured with spindle SC4-31.

Microtensile (Mechanical Properties)

Microtensile data were collected on an INSTRON 5565, equip with a "100 N load cell," on compression molded plaques, cut using an NAEF Punch Press with ASTM die D1708. A strain rate of 0.100 in/min was applied to each specimen, until failure (break defined as load <0.25 N). A minimum of three specimens, and maximum of five specimens, were collected per sample.

Samples and Results

Results are shown in the Tables 3-6 below.

TABLE 3

Inventive Examples with 80 wt % Filler

| | | Inv. Ex 1 | Inv. Ex 2 | Inv. Ex 3 | Comp. Ex A | Comp. Ex B | Comp. Ex C | Comp. Ex D |
|---|---|---|---|---|---|---|---|---|
| AFFINITY GA 1875 | % | 2.1 | 4.2 | 6.2 | 8.2 | | | |
| AFFINITY GA 1900 | % | | | | | 8.2 | | |
| AFFINITY GA1950 | | | | | | | 8.2 | |
| ENGAGE 8400 | % | 6.1 | 4.0 | 2.0 | | | | 8.2 |
| AMPLIFY GR216 | % | 1.0 | 1.0 | 1.0 | 1.0 | 1.0 | 1.0 | 1.0 |
| Tackifier | % | 8.2 | 8.2 | 8.2 | 8.2 | 8.2 | 8.2 | 8.2 |
| Oil | % | 1.0 | 1.0 | 1.0 | 1.0 | 1.0 | 1.0 | 1.0 |
| Wax | % | 1.6 | 1.6 | 1.6 | 1.6 | 1.6 | 1.6 | 1.6 |
| CaCO$_3$ | % | 80.0 | 80.0 | 80.0 | 80.0 | 80.0 | 80.0 | 80.0 |
| Antioxidant | % | 0.1 | 0.1 | 0.1 | 0.1 | 0.1 | 0.1 | 0.1 |
| Total % | % | 100.0 | 100.0 | 100.0 | 100.0 | 100.0 | 100.0 | 100.0 |

TABLE 4

Inventive Examples with 80 wt % Filler with Different Amounts of Oil, Tackifier, and Wax

| | | Inv. Ex. 4 | Inv. Ex. 5 | Inv. Ex. 6 |
|---|---|---|---|---|
| AFFINITY GA 1875 | % | 2.1 | 2.1 | 2.1 |
| AFFINITY GA 1900 | % | | | |
| AFFINITY GA 1950 | | | | |
| ENGAGE 8400 | % | 6.1 | 6.1 | |
| ENGAGE 8401 | | | | 6.1 |
| AMPLIFY GR216 | % | 1.0 | 1.0 | 1.0 |
| Tackifier | | 4.8 | 6.6 | 6.6 |
| Oil | % | 3.6 | 2.2 | 2.2 |
| Wax | | 2.4 | 2.0 | 2.0 |
| CaCO$_3$ | % | 80.0 | 80.0 | 80.0 |
| Antioxidant | % | 0.1 | 0.1 | 0.1 |
| Total | % | 100.0 | 100.0 | 100.0 |

TABLE 5

Properties of Examples

|  | Comp. Ex A | Comp. Ex B | Comp. Ex C | Comp. Ex D | Inv. Ex 1 | Inv. Ex 2 | Inv. Ex 3 |
|---|---|---|---|---|---|---|---|
| Preblend** Viscosity at 165° C., cP | 2,800 | 2,700 | 4,300 | 46,000 | 25,000 | 12,000 | 5,600 |
| Preblend** Viscosity at 120° C., cP | 6,500 | 7,500 | 13,500 | 164,000 | 86,900 | 39,700 | 19,200 |
| Viscosity at 165° C., cP | 242,000 | 394,000 | 682,000 | —* | 1,198,000 | —* | 264,000 |
| Tensile Strength, MPa | 1.9 | 1.8 | 2.25 | 2.60 | 2.56 | 2.33 | 2.06 |
| Tensile Elongation at Break, % | 15.1 | 13.9 | 15.8 | 101.1 | 75 | 59.4 | 30.2 |
| Young's Modulus, MPa | 167 | 151 | 192 | 189 | 213 | 176 | 174 |

*Over torqued LV Brookfield Viscometer.
**Preblend—no filler.

TABLE 6

Properties of Examples with Variations in Wax, Oil, and Tackifier

|  | Inventive Example 4 | Inventive Example 5 | Inventive Example 6 |
|---|---|---|---|
| Preblend** Viscosity at 165° C., cP | 15,044 | 20,396 | 22,046 |
| Preblend** Viscosity at 120° C., cP | 49,800 | 59,600 | 69,500 |
| Viscosity at 165° C. cP | 808,000 | 1,190,000 | —* |
| Tensile Strength, MPa | 2.47 | 2.34 | 3.58 |
| Tensile Elongation at Break, % | 14.9 | 33.8 | 26.1 |
| Young's Modulus, MPa | 210 | 202 | 349 |

*Over torqued LV Brookfield Viscometer.
**Preblend—no filler.

It has been discovered that the inventive compositions have excellent properties for carpet backing. The key performance requirements of filled backing formulations, for modular carpet backing are low preblend viscosity (less than 30,000 cP at 165° C.), high elongation at break (greater than 15%) and tensile modulus below 400 MPa. Table 5 shows properties of filled adhesive formulations. Examples 1-6 have preblend viscosities less than 30,000 cP at 165° C., which is beneficial for processing the material in the carpet industry. The preblend viscosities of Comparatives A-C, from high MI polyolefin elastomers, are below 5,000 cP, and the tensile "elongation at break" for filled specimens is between 13-16%. Comparative D is fabricated with the "30 MI" polyolefin elastomer, and has very high preblend viscosity (46,000 cP), but good tensile "elongation at break" (>100%). The tensile properties of this comparative exceed the needs of the application, but the viscosity is too high to implement. The preblend viscosity of Inventive Example 1 is near the upper limit of preblend viscosity, and represents a material with very high elongation at break in a filled formulation (exceeding 100%). Inventive Examples 2 and 3 have preblend viscosities in the desired range (12,044 cP and 5,600 cP respectively). Additionally Inventive Examples 2 and 3 have excellent tensile properties. The tensile "elongation at break" values for Inventive examples 2 and 3 are 30-60%, which are well above the application minimum performance.

An unexpected result occurred in the trend of tensile "elongation at break" for preblend compositions of the invention. A constant relationship was expected, between the preblend viscosity and tensile elongation at break. When the formulation is kept constant, and the only variable is the polymer MI (melt index), the properties should follow a set relationship. However the inventive preblends deviate from the expected relationship of preblend viscosity and tensile "elongation at break," as shown in FIG. 1. As seen in FIG. 1, the inventive compositions deviate from the expected properties of the comparative preblends in 80 wt % CaCO3.

What is claimed is:

1. A composition comprising the following components:
   A) a first ethylene/alpha-olefin interpolymer with a melt index I2A;
   B) a second ethylene/alpha-olefin interpolymer with a melt index I2B; and
   wherein a difference in melt index (I2): (I2A−I2B)≥400, and
   wherein I2B≤100 g/10 min;
   C) a filler, and wherein the filler is present in an amount ≥50 wt %, based on a weight of the composition;
   D) a tackifier; and
   wherein the composition excluding the filler (component C) has a melt viscosity, at 165° C., of ≤30,000 cP.

2. The composition of claim 1, further comprising, as component E, a wax.

3. The composition of claim 1, further comprising an oil.

4. The composition of claim 2, wherein the composition comprises component E, and a weight ratio of the oil to component E is from 0.5 to 1.5.

5. The composition of claim 1, wherein the first ethylene/alpha-olefin interpolymer has a melt index I2A≥400, and a density ≤0.895 g/cc.

6. The composition of claim 1, wherein component A and component B have a density ratio from 0.80 to 1.20.

7. The composition of claim 1, wherein the melt index I2A of component A and the melt index I2B of component B have a ratio of from 10 to 50.

8. The composition of claim 1, wherein the melt viscosity, at 165° C., of the composition, excluding the filler (component C), is from 5,000 cP to 30,000 cP.

9. The composition of claim 1, wherein a weight ratio of sum of components A and B to component D is from 1.0 to 2.0.

10. The composition of claim 1, wherein a weight ratio of sum of components A and B to component C is from 0.10 to 0.50.

11. The composition of claim 2, wherein the composition comprises component E, and a weight ratio of sum of components A and B to component E is from 3.0 to 5.5.

12. The composition of claim 1, wherein amount of a sum of components A and B is from 5.0 to 10 wt %, based on a weight of the composition.

13. An article comprising at least one component formed from the composition of claim 1.

14. A flooring structure comprising the article of claim 13.

* * * * *